United States Patent
Nagaraj

(10) Patent No.: US 7,333,835 B2
(45) Date of Patent: Feb. 19, 2008

(54) METHOD AND APPARATUS FOR PROVIDING USER SPECIFIC DOWNLINK BEAMFORMING IN A FIXED BEAM NETWORK

(75) Inventor: Shirish Nagaraj, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/411,189

(22) Filed: Apr. 25, 2006

(65) Prior Publication Data

US 2006/0194548 A1 Aug. 31, 2006

Related U.S. Application Data

(62) Division of application No. 10/696,930, filed on Oct. 30, 2003, now Pat. No. 7,054,664.

(51) Int. Cl.
*H04Q 7/20* (2006.01)

(52) U.S. Cl. .................. 455/562.1; 455/25; 455/63.4; 455/69; 455/103; 455/121; 455/193.1; 455/575.7; 342/154; 342/367; 342/368; 342/373; 342/417; 342/34

(58) Field of Classification Search .................. 455/25, 455/63.4, 65, 67.16, 73, 101, 103, 273, 276.1, 455/440, 436, 437, 450, 550.1, 562.1, 575.7; 370/209, 329, 334, 335, 342; 342/154, 367, 342/368, 373, 417
See application file for complete search history.

(56) References Cited

U.S. PATENT DOCUMENTS

| | | | |
|---|---|---|---|
| 5,045,859 A | 9/1991 | Yetter | |
| 6,130,643 A | 10/2000 | Trippett et al. | |
| 6,345,188 B1 | 2/2002 | Keskitalo et al. | |
| 6,433,738 B1 | 8/2002 | Kikuchi | |
| 2001/0034236 A1* | 10/2001 | Tong et al. | 455/450 |
| 2002/0068590 A1 | 6/2002 | Suzuki et al. | |
| 2003/0124994 A1* | 7/2003 | Ylitalo | 455/91 |
| 2003/0151553 A1 | 8/2003 | Ylitalo | |
| 2003/0157898 A1* | 8/2003 | Ylitalo | 455/67.5 |
| 2003/0162567 A1 | 8/2003 | Raghothaman et al. | |
| 2003/0169707 A1* | 9/2003 | Usuda et al. | 370/334 |
| 2003/0190897 A1 | 10/2003 | Lei et al. | |
| 2003/0198201 A1* | 10/2003 | Ylitalo et al. | 370/329 |
| 2003/0231606 A1* | 12/2003 | Wu et al. | 370/334 |
| 2004/0014499 A1 | 1/2004 | Hamalainen et al. | |
| 2004/0043736 A1* | 3/2004 | Hamalainen | 455/234.1 |
| 2004/0063468 A1 | 4/2004 | Frank | |

(Continued)

*Primary Examiner*—William Trost
*Assistant Examiner*—James D Ewart

(57) ABSTRACT

The disclosed embodiments relate to a system and method for providing user specific beams in a fixed beam network. In one embodiment, there is provided a mobile transceiver comprising a first device configured to receive phase reference signal data from a base station, the phase reference signal data being indicative of a first phase reference signal and a second phase reference signal that may be used by the mobile transceiver during a communication session, and a second device configured to determine whether the second phase reference signal is likely to provide improved reception between the base station and the mobile transceiver with respect to the first phase reference signal, wherein the second device is configured to transmit data to the base station, the data being indicative of whether the first phase reference signal or the second phase reference signal is likely to provide improved reception between the base station and the mobile transceiver.

17 Claims, 4 Drawing Sheets

U.S. PATENT DOCUMENTS

| | | |
|---|---|---|
| 2004/0076132 A1* | 4/2004 | Tiirola et al. ............... 370/335 |
| 2004/0082299 A1 | 4/2004 | Brunner et al. |
| 2004/0157646 A1 | 8/2004 | Raleigh et al. |
| 2004/0160921 A1* | 8/2004 | Kaipainen et al. .......... 370/335 |
| 2005/0101352 A1 | 5/2005 | Logothetis et al. |
| 2005/0174930 A1* | 8/2005 | Pedersen et al. ............ 370/208 |

* cited by examiner

METHOD AND APPARATUS FOR PROVIDING USER SPECIFIC DOWNLINK BEAMFORMING IN A FIXED BEAM NETWORK

CROSS-REFERENCE TO RELATED APPLICATIONS

This application is a divisional of U.S. application Ser. No. 10/696,930, filed on Oct. 30, 2003 now U.S. Pat. No. 7,054,664.

BACKGROUND OF THE INVENTION

1. Field of the Invention

The present invention relates generally to communication systems that transmit, receive and process communication signals and, more particularly, to providing user specific downlink beamforming in a fixed beam network.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Communication systems that transmit and receive communication signals continue to grow in importance. Such systems are used to provide television, radio, satellite communication, cell phone service, wireless computing networks and the like. An important aspect of such systems is the ability to efficiently process signals to continue to improve the quality of service provided to users.

Antenna arrays may be used to perform beamforming to enhance reception of signals from different angles of arrival, and transmit beamforming to enhance the quality of transmission of signals to different users. Phase offsets between signals received from a user on different elements of the antenna array depend on the angle of arrival of the user's signals at the antenna array. This phenomenon can be utilized to combine signals arriving from a desired direction constructively at the base station receiver using a receive beamformer. A receive beamformer is a device that receives inputs from the various elements of an antenna array and combines them into output signals or beams based on certain criteria.

In addition, transmit beamformers may be used to enhance signals prior to their transmission by an antenna array. Transmit beamformers may apply weighting coefficients to the signal intended for any user before transmission by an antenna array such that the desired signal strength for the user is enhanced and/or that the interference caused by this user's signal to other users is reduced. The weighting coefficients applied by a transmit beamformer may be adjusted according to various measurements of the signals received from the desired user at the antenna array or any other knowledge of the user's angle of location from the antenna array. Using transmit beamforming weight coefficients, the signal intended for a desired user may be thought of as being "steered" toward the direction of the desired user, such that the signals strength for the desired user is maximized and interference caused by this signal to users located at other angles is reduced.

Mobile transceivers, such as cellular telephone handsets, may be referred to as user equipment (UE). Channel estimation by a mobile transceiver is very important to realize beamforming gains. In many wireless communication systems, including third generation (3G) systems such as Universal Mobile Telephone Service (UMTS), phase reference signals may be provided to assist mobile transceivers in performing channel estimation and synchronizing on a received signal. The phase reference to be used by a mobile transceiver for a given communication session is typically specified by Radio Resource Control (RRC, or upper layer protocol) signaling. In UMTS and other systems, available phase references may include common pilot channels such as the primary common pilot channel (P-CPICH) and the secondary common pilot channel (S-CPICH). Another pilot channel, which may be referred to as a dedicated pilot channel (DPILOT) may be provided as well.

Because the mobile transceiver typically has no awareness that any type of beamforming is being applied (because of the proprietary nature of base station antenna configurations), the type of phase-reference that the mobile uses for its channel estimation and signal demodulation is an important aspect of the performance of the beamforming algorithm. Thus, beamformers have to be designed keeping in mind the phase-reference that a mobile transceiver is going to use.

Downlink beamforming is a method of signal transmission from a group of closely spaced antennas, such as a cellular telephone base station. Transmission from the base station may be designed such that the signals transmitted to a mobile transceiver all arrive co-phased at the mobile antenna. Because of the closely spaced nature of the base station antennas, the wireless channels from the base station antennas to the mobile antenna are all highly correlated. This correlation is represented by a spatial correlation matrix, which can be measured from uplink pilot signals. The spatial channel correlation is exploited by a beamformer, which applies appropriate complex weights to the signal at the different antenna elements. The weights may be designed such that a particular user's signals from all the transmitting antennas, after going through the channels, arrive coherently (or co-phased) at the user's receiving antenna. This typically results in a signal-to-interference ratio improvement of about a factor equal to the number of transmit antennas. As such, the design of a beamformer is an important element with respect to the performance of any multi-antenna system.

There are two types of beamformers that may be employed in a multi-antenna wireless system. One is the user-specific beamformer, which forms beams on a per user basis, one beam per user. This requires information on the user's channel characteristics, typically obtained through the spatial channel correlation matrix, which is computed based on an uplink pilot received when the mobile transceiver sends data to the base station. This correlation matrix essentially gives a measure of the direction in which the UE is located, which may allow a beamformer to form beams that point in that direction.

User specific beam forming has several shortcomings, however. User specific beamforming may employ the P-CPICH for channel estimation and synchronization purposes, but the P-CPICH may only be effective as a phase reference under certain conditions, such as when employed in systems with very few closely spaced antennas.

However, user specific beamforming strategies that are appropriate for systems that employ a very small number of closely spaced antennas may not work well when extended to systems that have many closely spaced antennas. This is because the correlation across the antennas decreases as the channel becomes more spatially scattered (leading to what is called as high angular spread). The problem of high angular spread arises when there are a large number of spatially dispersed local scatterers around the mobile user. Beamforming becomes less effective when angular spread is high because the signal energy arrives only partially co-phased at the mobile antenna. Further, the fact that the P-CPICH phase-reference is not beamformed leads to much steeper degradation in performance because the pilot and traffic see different channels as angular spread increases. This is known as pilot-to-traffic mismatch and beamforming systems must perform within extremely strict tolerances to optimally realize beamforming benefits in the face of such mismatches.

The other typical type of beamforming system is known as a fixed beamforming system. In fixed beamforming systems, the base station does not form beams appropriate for each and every user, but rather forms a set of few common beams pointing in different predetermined directions, such that the whole cell area of interest is covered. These common beams are called fixed because they do not adapt to any particular user's location. However, these common beams can be made to change from time to time depending on various factors, such as changes in traffic load pattern and the like. As long as the beams are not designed to serve any one particular user, but rather meant to serve a common cellular sub-area, that type of system is referred to a fixed beamforming network.

Fixed beamforming does not suffer from the pilot-to-traffic mismatch problem because the common pilot may be a secondary common pilot channel (S-CPICH), which may be sent over the same fixed beam that is used to serve a user. A user who happens to be at the peak of a beam being used for signal transmission may see the maximum possible beamforming benefit. A steep decline in performance because of steep roll-off of the beam patterns may be experienced by users that are between two beams. This performance decline may be on the order of around three (3) dB for a four (4) antenna base-station.

Fixed beamforming, therefore, is intrinsically not fair, because users get different quality of service (QoS) depending on their geographic location. This situation is clearly undesirable. These "coverage gaps" can be minimized by defining more fixed beams, but defining more fixed beams entails an increased power allocation for the overhead channels. This is true because correspondingly more secondary common pilot channels S-CPICHs would be needed. Another option is to sweep the beams periodically in time. However, this strategy trades the performance losses among the different users in time and does not alleviate the problem of performance loss completely.

Further, if a user moves from the coverage area of one beam to another, there is a typical delay in signaling the user to change its phase-reference (S-CPICH ID) because higher-layer signaling is involved. Because of this delay, the user could continue to use an "old" phase reference for some time, resulting in a much greater degradation of performance. This is an important problem since the beams have a very sharp decline in gain in areas beyond their main coverage areas.

SUMMARY OF THE INVENTION

The disclosed embodiments relate to a system and method for providing user specific beams in a fixed beam network. In one embodiment, there is provided a mobile transceiver comprising a first device configured to receive phase reference signal data from a base station, the phase reference signal data being indicative of a first phase reference signal and a second phase reference signal that may be used by the mobile transceiver during a communication session, and a second device configured to determine whether the second phase reference signal is likely to provide improved reception between the base station and the mobile transceiver with respect to the first phase reference signal, wherein the second device is configured to transmit data to the base station, the data being indicative of whether the first phase reference signal or the second phase reference signal is likely to provide improved reception between the base station and the mobile transceiver.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Embodiments of the present invention may form user-specific beams in the presence of a fixed beamforming network. If the network is configured to support secondary common pilot channels (S-CPICHs), which are transmitted with fixed beamforming weights, the users can be made to use one of the S-CPICHs as a phase reference for demodulating their signal. In that case, sending the user's signals with the same fixed beamforming weights as their reference S-CPICH channel is straightforward, but entails loss of performance because of the mismatch between the fixed beamforming weights and the channel seen by that user.

An improved strategy for providing user specific beamforming in a fixed beamforming network may employ the principle that the phase reference is a known fixed beamforming weight vector, and thus is employed to calculate good dedicated weights for each user, taking into account the fact that the mobile transceiver has no knowledge that beamforming is taking place. Embodiments of the present invention may utilize the user-specific channel correlation matrix information from uplink measurements to steer the user's signal in the direction of the mobile transceiver.

Figure 1:
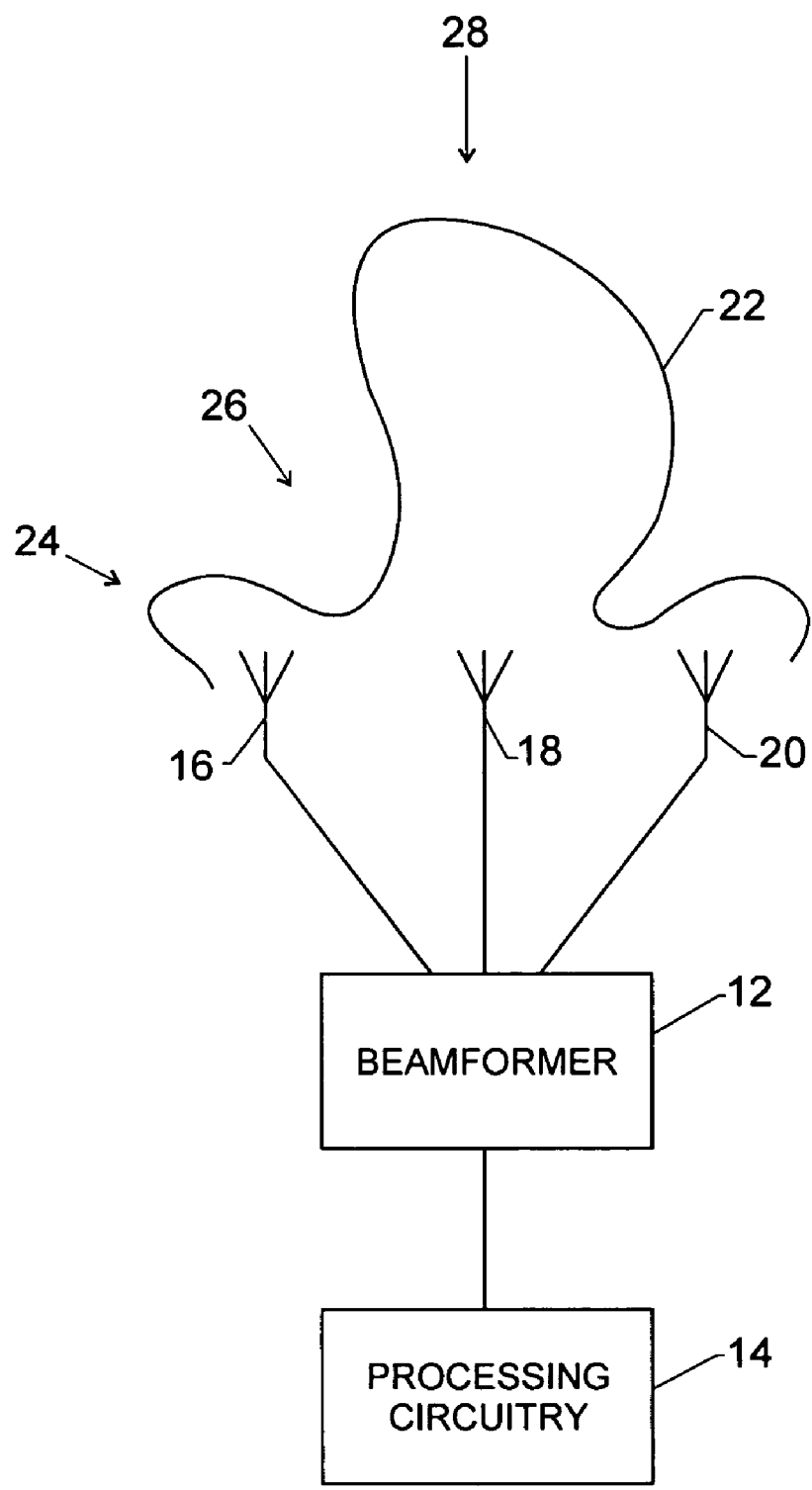
FIG. 1 is a block diagram illustrating a communication system in accordance with embodiments of the present invention.

Referring to the drawings, FIG. 1 is a block diagram illustrating a communication system in accordance with embodiments of the present invention. The communication system, which may comprise a cellular base station, is generally referred to by the reference numeral 10. A beamformer 12 is connected to receive and transmit signals from a plurality of antenna elements 16, 18 and 20. The antenna elements 16, 18 and 20 present an antenna pattern 22. The antenna pattern 22 is illustrative of the directions from which the antenna is likely to have the best reception of transmitted communication signals.

The antenna pattern 22 may comprise lobes, such as the lobes 24 and 28. Additionally, the antenna pattern may comprise troughs such as the trough 26. When processing received communication signals, the beamformer 12 may be adapted to provide fixed beams by employing weighting coefficient for received signal components indicative of a plurality of predefined directions. The beamformer 12 may employ dynamically controllable weighting coefficients to mathematically give greater weight to signals received from the predefined directions when producing its output signal.

The beamformer 12 is connected to processing circuitry 14, which may perform processing on communication signals after they are received or prior to being transmitted. As set forth above, the beamformer may be intended to provide a fixed beam communication network. Additionally, the beamformer 12 may be adapted to provide individualized beams to a plurality of users even though those users may not be in the general proximity of one of the predefined beams of the system 10. The use of the beamformer 12 to provide a fixed beam network is discussed below with respect to FIG. 2.

Figure 2:
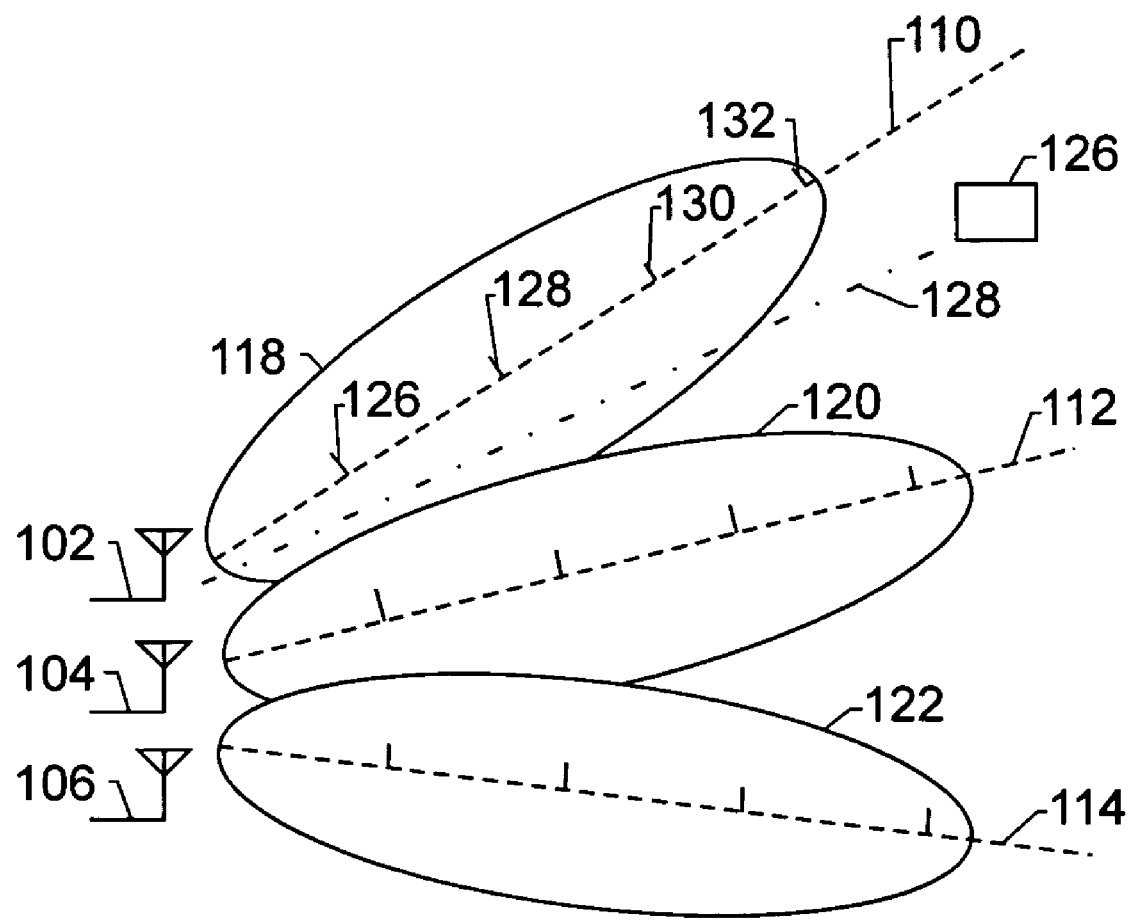
FIG. 2 is a block diagram showing the deployment of fixed beams in a fixed beam network in accordance with embodiments of the present invention.

FIG. 2 is a block diagram showing the deployment of fixed beams in a fixed beam network in accordance with embodiments of the present invention. The fixed beam network is generally referred to by the reference numeral 100. As illustrated in FIG. 2, embodiments of the present invention relate to the incorporation of user specific beamforming in a fixed beam network in which common pilot synchronizing signals are sent over the fixed beams. The optimal user-specific open-loop beamformer when the demodulation of the signal is performed via a pre-determined fixed beam phase reference is derived. The beamformer 12 (FIG. 1) may be applicable for an arbitrary antenna configuration without any assumptions on the channel covariance matrix. By way of example, a three-element antenna array is illustrated in FIG. 2.

In FIG. 2, the fixed beam network 100 is established by a three-element antenna array that comprises antenna elements 102, 104 and 106. The antenna array may comprise a portion of a cellular telephone base station or the like. A beamformer such as the beamformer 12 (FIG. 1) is adapted to provide three fixed beams 110, 112 and 114. Each of the fixed beams 110, 112 and 114 provide a coverage envelope where reception is the strongest. In FIG. 2, the fixed beams 110, 112 and 114 respectively provide coverage envelopes 118, 120 and 122.

The fixed beam system 100 may include circuitry or software (not shown) that assigns a particular beam to a particular user when the user is in the proximity of one of the coverage envelopes 118, 120 or 122. When a user is between one of the fixed beams, the user's reception would be degraded compared to when the user is within one of the coverage envelopes 118, 120 or 122.

The following discussion employs UMTS terminology and assumes the pilot structure to be available as in UMTS, although the concepts developed are applicable in principle to any wireless system that allows for such pilot configurations. In wireless communication systems, pilot channels provide a known phase reference synchronization signal that may be used by a mobile transceiver to locate data elements within the transmitted data packets.

In UMTS systems, there are three standard phase-references that may be employed by a mobile transceiver to perform channel estimation and assist in signal synchronization. One is the primary common pilot channel (P-CPICH), which is typically a common pilot transmitted over the whole cell of interest by a single antenna.

The second type of pilot that may be employed as a phase reference signal is the secondary common pilot channel (S-CPICH). More than one S-CPICH may be employed in each cell. As set forth below, the S-CPICH may be beamformed with fixed beams, with one pilot going out per beam. At the time of call initiation, the user's S-CPICH ID may be determined based on that user's uplink signal. The base station sends certain signal strength measurements to the Radio Network Controller (RNC), which then decides which beam is ideally suited for that user (if that user is configured to use S-CPICH as phase-reference). Then, knowing the mapping between the beams and the S-CPICH ID, the RNC may convey both to the user and to the base station, the S-CPICH ID that the user is going to use for its demodulation. The beam corresponding to this S-CPICH ID may be termed as the serving beam for that user. The RNC can also decide to switch the S-CPICH ID (or equivalently, the serving beam) if uplink measurements indicate that the user has moved into the area of another beam.

The third pilot that may be used for phase reference purposes is the dedicated pilot (DPILOT), which is time-multiplexed with the user's data signal. At first glace, the DPILOT seems to be the best choice as far as phase-reference is concerned in beamformed systems because the DPILOT is also beamformed with the same weights that the data is transmitted with, resulting in a perfectly matched channel estimate. However, the DPILOT is a very weak pilot and the number of symbols available for channel estimation is also limited, leading to a very noisy channel estimate. Thus, DPILOT is very unreliable and cannot be used for beamformed systems. Simulations have shown that using the DPILOT as phase-reference results in much degraded beamforming performance.

Each of the fixed beams 110, 112 and 114 in FIG. 2 are shown as incorporating secondary common pilot channels (S-CPICHs) therein. The fixed beam 110 incorporates secondary common pilot channels 126, 128, 130 and 132, which may be used for synchronization by user equipment. The use of the secondary common pilot channels 126, 128, 130 and 132 typically improves user reception and does not result in traffic to pilot mismatch. The fixed beams 112 and 114 are illustrated to have secondary common pilot channels incorporated therein, but those secondary common pilot channels are not given reference numerals for purposes of simplifying FIG. 2.

As set forth above, embodiments of the present invention may employ beam steering to create user specific beams, providing a benefit accrued by sending the user's signals over the same fixed beam that the user is configured to demodulate as its phase reference (for example, the secondary common pilot channel). For example, if a mobile user 126 is between the coverage envelopes 118 and 120 provided by the fixed beams 110 and 112, as shown in FIG. 2, a beamformer may be adapted to provide a user specific beam 128 directed at the mobile user 126 to improve the user's reception.

As set forth above, embodiments of the present invention may create user-specific beams in the presence of a fixed beamforming network. If the network is configured to support S-CPICHs, which are transmitted with fixed beamforming weights, the users can be made to use one of the S-CPICH's as a phase reference for demodulating their signal. In that case, sending the users signals with the same fixed beamforming weights as their reference S-CPICH channel is straightforward, but entails loss of performance due to the fact that none of the fixed beams is optimally appropriate for a particular user.

Embodiments of the present invention may employ the principle that dedicated weights for each user can be computed because the phase reference signal (S-CPICH) is a channel that is seen from a known fixed beamforming weight vector. This computation implicitly accounts for the fact that the mobile has no knowledge of any such beamforming being applied. This beamformer utilizes the user-specific channel correlation matrix information from uplink measurements to steer the user's signal in the direction of the user's mobile transceiver. The beamformer then determines transmission weighting coefficients to be applied to a return signal based on the difference between the reception correlation data and the fixed beam weighting coefficients associated with the S-CPICH that has been designated for the user's communication session.

The following discussion illustrates how a user specific beamformer is determined in the context of a fixed beam network environment. On the downlink, it may be assumed that the signal for a user is beamformed with M closely spaced transmitting antennas. The beamformed is given by an M-dimensional complex valued weight vector $v_0$. Let the $l^{th}$ multipath channel from the transmit antennas to the mobile receive antenna be denoted by $h_l$, where $l=1, 2, \ldots, L$. As used herein, $x^*$, $x^T$ and $x^\dagger$ denote the conjugate, transpose and Hermitian operations for a vector x. Further, $\Re\{.\}$ and $\Im\{.\}$ denote the real and imaginary parts of a complex-valued entity. M fixed beams are defined, given by weight matrix $W=[w_1, w_2, \ldots, w_M]$ with the property that:

$$w_i^\dagger w_j = 0 \text{ if } i \neq j \text{ and}$$

$$\|w_i\|^2 = 1, i=1,2,\ldots,M \tag{1}$$

Each fixed beam vector $w_i$ is used to carry one S-CPICH pilot.

The received signal at the mobile, for the $l^{th}$ multipath channel and the $i^{th}$ symbol instance, after despreading with the scrambling and channelization codes, is given by:

$$y_l(i) = \sqrt{P} v^T h_l(i) s(i) + n_l(i) \tag{2}$$

Here, s(i) is the binary information symbol to be transmitted, $P=NE_c$, where N is the spreading gain of a code division multiple access (CDMA) signal and $E_c$ is the transmit energy per chip for that user. The random interference plus noise component $n_l(i)$ is complex-valued zero-mean Gaussian distributed with variance equal to $\sigma_l^2$. Further, $h_l(i)$ is a zero-mean complex Gaussian channel with correlation matrix $R_{hh}(l)$ that can be estimated from uplink measurements. The reception correlation data that comprises the correlation matrix $R_{hh}(l)$ is obtained from uplink communications from a mobile transceiver and may be based on received pilot signals transmitted by the mobile transceiver. These signals may indicate the direction of the mobile transceiver with respect to the base station. This long-term correlation matrix estimation has as input, the uplink channel estimate, denoted by $\hat{h}_l$, for the $l^{th}$ multipath:

$$R_{hh}(l) = \alpha R_{hh} + (1-\alpha) \hat{h}_l^* \hat{h}_l^T \tag{3}$$

The best beam that is used to serve as a phase-reference for that user is determined as follows:

$$m = \arg\max_{k=1,\ldots,M} \sum_{l=1}^{L} w_k^\dagger R_{hh}(l) w_k \tag{4}$$

Using this, the user is signaled via RRC layer signaling to use the S-CPICH ID that corresponds to the fixed beam m.

The optimal beamformer $v_0$ is computed as a weighted linear combination of the fixed beam weight vectors as follows:

$$v_o = Wu = \sum_{i=1}^{M} u(i) w_i \tag{5}$$

Further, a "virtual channel" vector may be defined as:

$$g_l(i) = W^T h_l(i) = [w_1^T h_l(i), \ldots, w_M^T h_l(i)]^T \tag{6}$$

with a correlation matrix given by:

$$R_{gg}(l) = W^T R_{hh}(l) W^* \tag{7}$$

The decision statistic for the detection of s at the mobile, using the channel estimate from the S-CPICH, is given by $$z = \sum_{l=1}^{L} \Re\{(w_m^T h_l(i))^* y_l(i)\} \tag{8}$$

$$= \sum_l \Re\left\{g_{m,l}(i)^* \left(\sqrt{P} \sum_{k=1}^{M} u_k g_{k,l}(i) s(i) + n_l(i)\right)\right\}$$

where $g_{m,l}(i)$ is the $m^{th}$ component of $g_l(i)$ and the S-CPICH channel estimate is assumed to be ideal.

This virtual channel may be expressed in terms of the phase-reference channel estimate $g_{m,l}(i)$, as:

$$g_l(i) = g_{m,l}(i) p_l + q_l(i) \tag{9}$$

with $E[g_{m,l}(i)^* q_l(i)] = 0$

Let $\rho_{mk}(l) = E[g^*_{m,l} g_{k,l}]$ and $\sigma_g^2(m,l) = E[|g_{m,l}|^2]$. Then define $$p_l = \left[\frac{\rho_{m1}(l)}{\sigma_g^2(m,l)}, \ldots, 1, \ldots, \frac{\rho_{mM}(l)}{\sigma_g^2(m,l)}\right]^T \tag{10}$$

$$= \left[\frac{w_m^\dagger R_{hh}(l) w_1}{w_m^\dagger R_{hh}(l) w_m}, \ldots, \frac{w_m^\dagger R_{hh}(l) w_M}{w_m^\dagger R_{hh}(l) w_m}\right]^T$$

where the unity appears in the $m^{th}$ position in the first equation.

Define the sum correlation matrix of the zero-mean complex-valued Gaussian distributed vector $q_l$ overall all paths, as:

$$Q = Q_1 + jQ_2 = \sum_{l=1}^{L} [R_{gg}(l) - \sigma_g^2(m,l)p_l^* p_l^T] \quad (11)$$

where $j=\sqrt{-1}$. Define $X=[(Q_1+\gamma I)+Q_2(Q_1+\gamma I)^{-1}Q_2]^{-1}$, where $\gamma>0$ is an estimate of the noise variance at the receiver. This can be set to a nominal value depending on the average user geometries. Then, the optimal beamformer is given by:

$$v_o = \frac{1}{\kappa} W(I + j(Q_1 + \gamma I)^{-1} Q_2) X \bar{p}^* \quad (12)$$

where $$\bar{p} = \sum_{l=1}^{L} p_l$$

and $\kappa>0$ is a normalization constant to ensure $\|v_0\|^2=1$. The overall process for the computation of a user specific beam in the context of a fixed beam network is described below with reference to FIG. 3.

Figure 3:
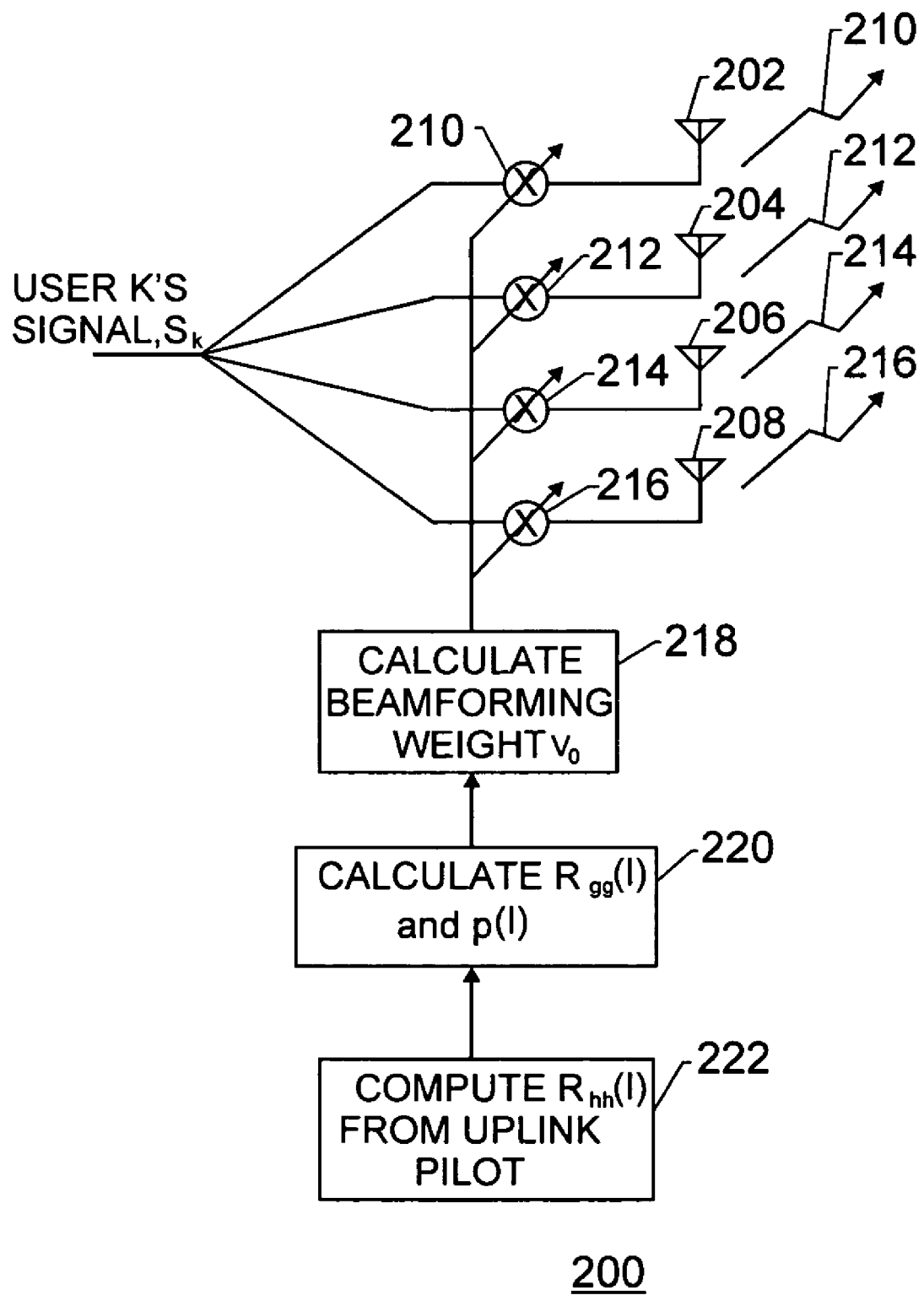
FIG. 3 is a schematic diagram showing the operation of a beamformer in accordance with embodiments of the present invention.

FIG. 3 is a schematic diagram showing the operation of a beamformer in accordance with embodiments of the present invention. The system shown in FIG. 3, which may correspond to a cellular telephone base station, is generally referred to by the reference numeral 200.

The system shown in FIG. 3 comprises four closely spaced antenna elements 202, 204, 206 and 208. For purposes of simplicity, the system 200 is illustrated as acting on a single user's signal, which is identified as $s_k$.

The antenna elements 202, 204, 206 and 208 respectively produce a plurality of fixed beams 210, 212, 214 and 216. A beamformer, such as the beamformer 12 (FIG. 1) may be adapted to transmit a signal on a user specific beam relative to one of the fixed beams 210, 212, 214 and 216, as described above. In so doing, transmission coefficients are computed and applied to the antenna elements 202, 204, 206 and 208 when the signal $s_k$ is transmitted. Transmission coefficients represented as $v_0$ in FIG. 3 may be applied to the signal $s_k$ by a series of multipliers 210, 212, 214 and 216. One transmission coefficient for each of the fixed beams 210, 212, 214 and 216 may be applied to the signal $s_k$.

In operation, the beamformer 12 (FIG. 1) may compute reception correlation data for a received signal, as shown at block 222. The reception correlation data may represent an uplink channel correlation matrix $R_{hh}(l)$, which may be computed according to Equation 3 above. As shown at block 220, the reception correlation data may be employed to compute a beam space channel correlation matrix $R_{gg}(l)$ and a beam space correlation vector p(l), which represent the difference between the reception correlation data and the fixed beam correlation coefficients associated with the fixed beam 210, 212, 214 or 216 assigned for the particular transmission. The beam space channel correlation matrix $R_{gg}(l)$ may be computed according to Equation 7 above and the beam space correlation vector p(l) may be computed according to Equation 10 above.

Finally, the beam space channel correlation matrix $R_{gg}(l)$ and the beam space correlation vector p(l) may be employed to compute an optimal beamforming weight vector $v_0$, as shown at block 218. The beamforming weight vector $v_0$ may be computed as shown in Equation 12 above. As set forth above, the beamforming weight vector $v_0$, may be applied to the signal $s_k$ as it is transmitted.

Embodiments of the present invention may be compliant with Release 99 and Release 5/6 of UMTS standards. In order to maintain that compliance, beam selection is done initially at the time of call set-up. The initial beam that is selected may be updated at a very slow rate, because any change in beam would require a change in the S-CPICH ID phase reference, which may require an RRC signaling request. This approach may be referred to as the quasi-static beam reference user specific beamforming approach.

Embodiments of the present invention may provide improvements that are transparent to a user who is using a mobile transceiver. Additionally, embodiments of the present invention may be standards compliant and may not require any change in current specifications. Performance enhancements when multiple S-CPICHs are allowed to be used as phase references by the user equipment are possible, although that case may not be strictly compliant with the current UMTS standards.

For channels with small angle-spread, embodiments of the present invention may provide improved performance. Specifically, embodiments of the present invention may achieve improved beamforming gain for a given number of antennas. For larger angle-spreads, performance may approach that of a pure fixed beamforming system, which may make communication systems more robust to angle-spread than a system in which the primary common pilot channel (P-CPICH) is employed as the phase reference.

Embodiments of the present invention may be fair, in that all users may get similar performance irrespective of their geographic location. Additionally, embodiments of the present invention may be more robust to delays in signaling a change in phase-reference. When a user moves from the coverage area of one beam to another, RRC layer signaling may be involved to indicate the mobile to change the phase-reference to another S-CPICH ID.

Embodiments of the present invention may avoid scalloping losses inherently, without the added complexity and cost associated with systems in which many non-orthogonal beams per sector are defined or systems that apply beam sweeping (a concept similar to the phase sweep transmit diversity (PSTD)). In addition, the optimal beam sweeping frequency for dedicated channels can differ significantly from the optimal frequency for shared channels-a problem in mixed traffic environments. The computational complexity employed in embodiments of the present invention may be similar to the complexity of user-specific beamformers.

Alternative embodiments of the present invention may employ fast beam selection, which may rely on input derived from a mobile transceiver. In that case, the mobile transceiver, which could be a cellular telephone handset, computes the best beam (or the best S-CPICH channel) at every slot and feeds back this information to the base station. Further, it may be possible to incorporate this feedback within the current feedback bit-rate available. A cellular handset that is adapted to employ fast beam selection is illustrated in FIG. 4.

Figure 4:
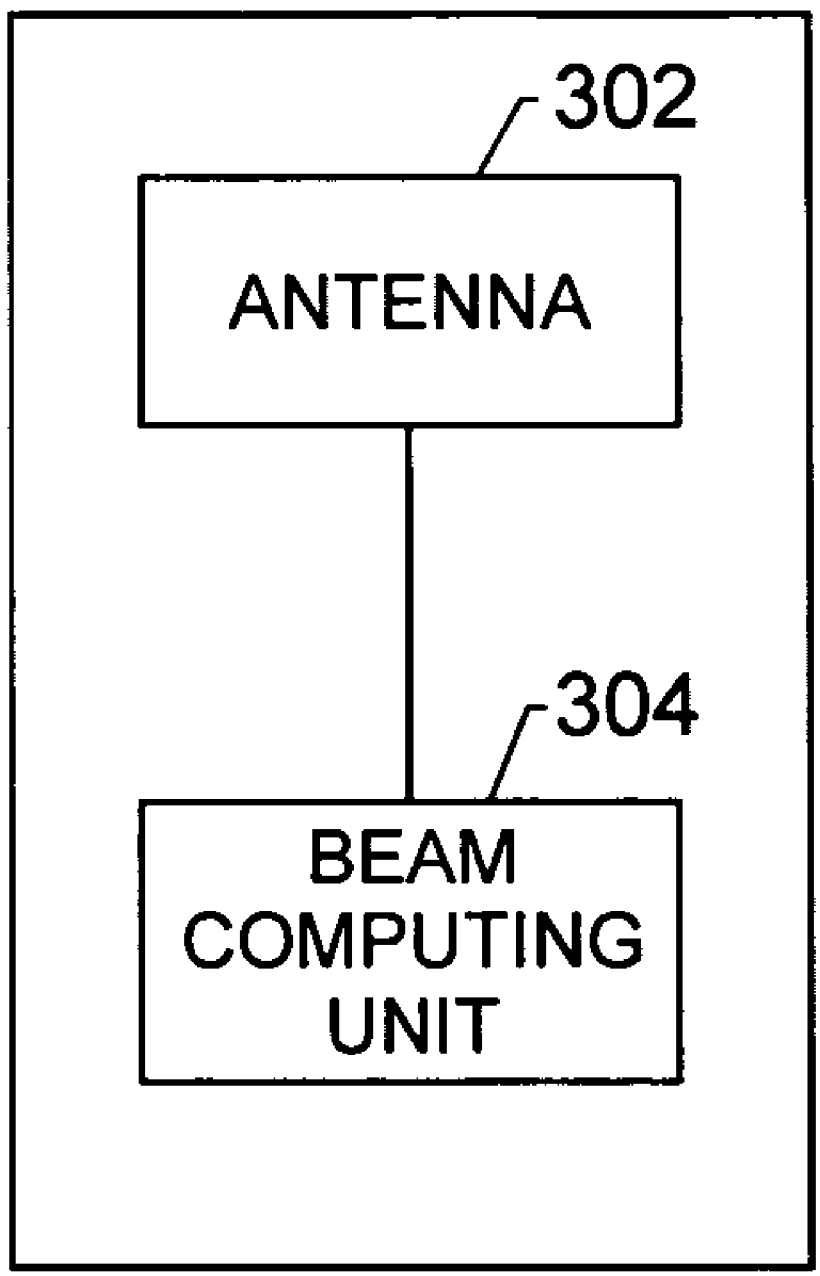
FIG. 4 is a block diagram showing a mobile transceiver in accordance with an alternative embodiment of the present invention.

FIG. 4 is a block diagram showing a mobile transceiver in accordance with an alternative embodiment of the present invention. The mobile transceiver, which may comprise a cellular telephone handset, is generally referred to by the reference numeral 300. The mobile transceiver may comprise an antenna 302, which may be adapted to send and receive signals to and from a base station, such as a cellular telephone base station. A beam computing unit 304, which may comprise software, hardware or a combination of both, may be adapted to determine the ID of a fixed beam that is being used to transmit information between the mobile transceiver 300 and a base station.

At the beginning of a call, the RRC may identify to the mobile transceiver 300 and the associated base station a set of two S-CPICH IDs that the mobile transceiver 300 could use as a phase-reference during a communication session. One of these S-CPICHs may be denoted as the first S-CPICH and the other may be designated as a second S-CPICH. At every slot, the beam computing unit 304 may measure the signal to noise ratio on the two S-CPICHs that it has been told to monitor. The mobile transceiver 300 may signal the best S-CPICH ID back to the base station, using one bit of feedback per slot (which is compatible with the current allowed feedback bit rate in UMTS). If the best S-CPICH is the first S-CPICH ID, the feedback bit is set to a specific value, such as 1. If the best S-CPICH ID is the second S-CPICH, the feedback bit may be set to a different value, such as 0 or −1. In this manner, the base station, at every time slot, may compute the best beamforming weight vector using Equations 10, 11 and 12 based on the position of the mobile transceiver 300 relative to the beams associated with either the primary S-CPICH or the secondary S-CPICH.

Recomputing these equations may result in the beamforming taking into account an improved beam index m, which may change from slot to slot. The performance improvements obtained with this scheme, in comparison to the quasi-static beam reference case, may be significant for users that are in between beams because they exhibit the most variation in the best S-CPICH phase-reference.

Embodiments of the present invention may allow the users in between beams to benefit because of the fact that the two S-CPICH channels for them are almost identical in average strength, leading to great gains with selection transmit diversity. Moreover, embodiments of the present invention may be incorporated with very minimal changes to the current standards such as the UMTS standard. This is true because only a single bit of feedback is required per slot, which is supported by the existing UMTS standard. For users that are at the peak of a fixed beam to begin with, an embodiment of the present invention may result in almost identical performance as that of the quasi-static beamforming systems.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A mobile transceiver, comprising:
   a first device configured to receive phase reference signal data from a base station, the phase reference signal data being indicative of a first phase reference signal and a second phase reference signal that may be used by the mobile transceiver during a communication session; and
   a second device configured to determine whether the second phase reference signal is likely to provide improved reception between the base station and the mobile transceiver with respect to the first phase reference signal, wherein the second device is configured to transmit data to the base station, the data being transmitted to the base station as a single feedback bit of information indicative of whether the first phase reference signal or the second phase reference signal is likely to provide improved reception between the base station and the mobile transceiver.

2. The mobile transceiver set forth in claim 1, wherein the mobile transceiver comprises a cellular telephone handset.

3. The mobile transceiver set forth in claim 1, wherein the data that is indicative of whether the first phase reference signal or the second phase reference signal is likely to provide improved reception between the base station and the mobile transceiver is transmitted to the base station during each slot in which the mobile transceiver transmits information to the base station.

4. The mobile transceiver set forth in claim 1, wherein the second device is configured to determine an ID of a fixed beam that is being used to transmit information between the mobile transceiver and the base station.

5. The mobile transceiver set forth in claim 1, wherein the second device is configured to determine whether a second common pilot channel is likely to provide improved reception between the base station and the mobile transceiver with respect to a first common pilot channel.

6. The mobile transceiver set forth in claim 5, wherein the second device is configured to identify a first ID associated with the first common pilot channel and a second ID associated with the second common pilot channel.

7. The mobile transceiver set forth in claim 5, wherein first common pilot channel and the second common pilot channel are both secondary common pilot channels.

8. The mobile transceiver set forth in claim 1, wherein the mobile transceiver is configured to operate on a Universal Mobile Telecommunication System.

9. A method of identifying a beam from among a plurality of fixed beams in a fixed beam network, the method comprising:
   receiving phase reference signal data, the phase reference signal data being indicative of a first phase reference signal and a second phase reference signal that may be used during a communication session, each of the first phase reference signal and the second phase reference signals being associated with a different one of the plurality of fixed beams;
   determining whether beam corresponding to the second phase reference signal is likely to provide improved signal reception during a communication session with respect to the beam corresponding to the first phase reference signal; and
   transmitting a single bit of feedback data indicative of whether the beam corresponding to the first phase reference signal or the beam corresponding to the second phase reference signal is likely to provide improved reception during the communication session.

10. The method set forth in claim 9, comprising transmitting the data that is indicative of whether the first phase reference signal or the second phase reference signal is likely to provide improved reception to the base station during each slot in which information is transmitted.

11. The method set forth in claim 9, wherein the receiving comprises receiving a first common pilot channel ID and a second common pilot channel ID.

12. The method set forth in claim 9, wherein the transmitting comprises transmitting data to a base station.

13. The method set forth in claim 9, wherein the determining comprises determining whether the second phase reference signal improves a beamforming weight vector.

14. The computer readable storage medium which stores a computer readable program comprising:
   code adapted to receive phase reference signal data, the phase reference signal data being indicative of a first phase reference signal and a second phase reference signal that may be used during a communication session, each of the first phase reference signal and the second phase reference signals being associated with a different one of the plurality of fixed beams;
   code adapted to determine whether beam corresponding to the second phase reference signal is likely to provide improved signal reception during a communication session with respect to the beam corresponding to the first phase reference signal; and
   code adapted to transmit a single bit of feedback data indicative of whether the beam corresponding to the first phase reference signal or the beam corresponding to the second phase reference signal is likely to provide improved reception during the communication session.

15. The computer readable storage medium set forth in claim 14, code adapted to transmit the data that is indicative of whether the first phase reference signal or the second phase reference signal is likely to provide improved reception to the base station during each slot in which information is transmitted.

16. The computer readable storage medium set forth in claim 14, comprising code adapted to receive a first common pilot channel ID and a second common pilot channel ID.

17. The computer readable storage medium set forth in claim 14, comprising code adapted to determine whether the second phase reference signal improves a beamforming weight vector.

* * * * *